(12) United States Patent
Fujita

(10) Patent No.: US 9,221,605 B2
(45) Date of Patent: Dec. 29, 2015

(54) ARTICLE TRANSFER DEVICE AND STACKER CRANE HAVING SAME

(75) Inventor: Takashi Fujita, Higashiomi (JP)

(73) Assignee: Daifuku Co., Ltd., Osaka-shi (JP)

( * ) Notice: Subject to any disclaimer, the term of this patent is extended or adjusted under 35 U.S.C. 154(b) by 678 days.

(21) Appl. No.: 13/390,607

(22) PCT Filed: Jul. 15, 2010

(86) PCT No.: PCT/JP2010/061991
§ 371 (c)(1),
(2), (4) Date: Apr. 26, 2012

(87) PCT Pub. No.: WO2011/021453
PCT Pub. Date: Feb. 24, 2011

(65) Prior Publication Data
US 2012/0201642 A1 Aug. 9, 2012

(30) Foreign Application Priority Data

Aug. 21, 2009 (JP) .................................. 2009-192447

(51) Int. Cl.
*B65G 1/04* (2006.01)
(52) U.S. Cl.
CPC ............ *B65G 1/0407* (2013.01); *B65G 1/0435* (2013.01)
(58) Field of Classification Search
CPC .... B65G 1/0407; B65G 1/0435; B66F 9/122; B66F 9/183; B66F 9/184

USPC .......... 414/277, 278, 280, 621, 659, 661, 664
See application file for complete search history.

(56) References Cited

FOREIGN PATENT DOCUMENTS

| DE | 3305277 A1 | 8/1984 |
|---|---|---|
| JP | 05037716 U | 5/1993 |
| JP | 11189305 A | 7/1999 |
| JP | 11246005 A | 9/1999 |
| JP | 2000211705 A | 8/2000 |
| JP | 2000289809 A | 10/2000 |
| JP | 2002114317 A | 4/2002 |
| JP | 2003246413 A | 9/2003 |
| JP | 2006182510 A | 7/2006 |

*Primary Examiner* — Ernesto Suarez
*Assistant Examiner* — Brendan Tighe
(74) *Attorney, Agent, or Firm* — The Webb Law Firm

(57) ABSTRACT

An article transfer device includes a placement support portion that is provided to a base platform and includes a pair of divided placement support portions for separately receiving and supporting both side portions, in the article lateral direction, of the bottom surface of an article, and a pair of clamp portions that can be projected and retracted along an article transfer direction with respect to the placement support portion and can be moved toward and away from each other by a clamp actuator between gripping positions and releasing positions that are spaced apart wider. The pair of divided placement support portions can be moved toward and away from each other within a movable range defined in the article lateral direction by a placement support portion actuator and to face each other in close proximity when located in approach limit positions of the movable range.

8 Claims, 9 Drawing Sheets

ARTICLE TRANSFER DEVICE AND STACKER CRANE HAVING SAME

FIELD OF THE INVENTION

The present invention relates to an article transfer device, and more specifically to an article transfer device for transferring two or more kinds of articles having different lengths in an article lateral direction which is perpendicular to an article transfer direction comprising a placement support portion that is provided to a base platform and that receives and supports an article to be transferred; a pair of clamp portions that are configured to be moved along the article transfer direction with respect to the placement support portion, and that are capable of being moved toward and away from each other between gripping positions for gripping the article to be transferred and releasing positions that are spaced apart wider than the gripping positions; and a clamp actuator for moving the pair of clamp portions toward and away from each other.

BACKGROUND ART

The article transfer device described above is provided in, for example, an article transport vehicle, or a stacker crane. The device transfers the article to be transferred to or from a transfer target location provided at an end of an article storage rack or of a conveyor for moving articles, etc. by moving a pair of clamp portions with the article to be transferred gripped by the pair of clamp portions, and by transporting the article in an article transfer direction while supporting the bottom surface of the article by a placement support portion.

As for the articles to be transferred, there are two or more kinds of articles with each kind having a different length in an article lateral direction from the rest. The device is configured to be able to transfer the two or more kinds of the articles by changing the distance between the pair of clamp portions in the gripping positions with a clamp actuator depending on the length, in the lateral direction, of the article to be transferred.

An example of such an article transfer device is one in which a placement support portion, for receiving and supporting the bottom surface of an article, has three support portions including a central support portion that is fixedly provided to a base platform and that supports a central part of the bottom surface of an article in the article lateral direction, and a pair of side support portions which can be moved in the article lateral direction so that the both side portions, in the article lateral direction, of the bottom surface of the article can be supported. (See, for example, Patent Document 1).

When supporting articles of two or more different kinds having different lengths in the article lateral direction by such a placement support portion, the pair of side support portions are moved toward or away from each other depending on the length, in the article lateral direction, of the article to be transferred to move the side support portions to the positions where both side portions of the bottom surface of the article to be transferred can be supported. By configuring the placement support portion in this manner, the weight of the entire equipment can be reduced since the weight of the placement support portion is reduced in comparison with the case where the entire area—in the lateral direction—of the bottom surface of the article is received and supported.

PRIOR-ART REFERENCES

Patent Documents

[Patent Document 1]
JP Publication Of Application No. 2000-289809 (Paragraph [0017] and FIGS. 3 and 4)

SUMMARY OF THE INVENTION

Problems to be Solved by the Invention

However, since the conventional article transfer device described above includes the placement support portion having the central support for supporting the central part, in the article lateral direction, of the bottom surface of an article, each of the pair of the side support portions is moved toward the central support located between the side support portions with respect to the article lateral direction such as to approach it from the outside when moving the pair of side support portions toward each other in the article lateral direction. Thus, although the pair of side support portions can be moved toward each other and to positions close to the central support, they cannot be moved any closer to each other than that.

Therefore, when the article to be transferred is one that is short in the article lateral direction, it is possible that the pair of side support portions cannot be moved to positions that are close enough to each other such that both lateral side portions of the bottom surface can be received and supported by the pair of side support portions. Therefore, in order to support both side portions of the bottom surface, of the article by the pair of side support portions, the length in the article lateral direction of the article to be transferred needs to be limited to be longer than an approximate dimension that is a sum of the length, in the article lateral direction, of the pair of side support portions and the length, in the article lateral direction, of the central support; thus, there are cases where articles having a small length in the article lateral direction can not be transferred.

The present invention was made in light of the current status of the art and its object is to provide an article transfer device that can transfer articles that have as small a length in the article lateral direction as possible.

Means for Solving the Problems

To achieve this object, an article transfer device, in accordance with the present invention, for transferring two or more kinds of articles having different lengths in an article lateral direction which is perpendicular to an article transfer direction comprises: a placement support portion that is provided to a base platform and that receives and supports an article to be transferred; a pair of clamp portions that are configured to be moved along the article transfer direction with respect to the placement support portion, and that are capable of being moved toward and away from each other between gripping positions for gripping the article to be transferred and releasing positions that are spaced apart wider than the gripping positions; and a clamp actuator for moving the pair of clamp portions toward and away from each other. The placement support portion includes a pair of divided placement support portions that separately receive and support both side portions, in the article lateral direction, of a bottom surface of the article to be transferred wherein the pair of divided placement support portions are configured to be moved toward and away from each other within limits of a movable range defined in the article lateral direction and to face each other in close proximity when located at approach limit positions which are limit positions in the movable range that are closer to each other, wherein there are provided a placement support portion actuator for moving the pair of divided placement support portions toward and away from each other and a controller for controlling operations of the clamp actuator and the placement support portion actuator based on length information, in the article lateral direction, of the article to be transferred.

With such a configuration, because the placement support portion includes a pair of divided placement support portions that separately receive and support both side portions, in the article lateral direction, of the bottom surface of an article to be transferred, and because the divided placement support portions are configured to be moved toward and away from each other within the limits of the movable range defined in the article lateral direction, the controller can control the operation of the placement support portion actuating means based on the length information, in the article lateral direction, of the article to be transferred such that the pair of divided placement support portions are moved toward or away from each other within the limits of the movable range to the positions that correspond to or are suitable for the length in the article lateral direction of the article to be transferred.

And with the controller controlling the operation of the clamp actuating means based on the length information in the article lateral direction of the article to be transferred, the pair of clamp portions are moved toward and away from each other between the gripping positions for gripping the article to be transferred and releasing positions spaced apart wider than the gripping positions.

Thus, as a result of the pair of divided placement support portions, as well as the pair of clamp portions, being moved toward or away from each other to the positions that correspond to or are suitable for the length, in the article lateral direction, of the article to be transferred, the article to be transferred can be transferred by projecting and retracting the pair of clamp portions along the article transfer direction with respect to the placement support portion. Therefore, articles of various sizes with various lengths from short to long in the article lateral direction can be transferred.

And because the pair of divided placement support portions are configured to face each other in close proximity when they are located at the approach limit positions which are end positions in the movable range where the support portions are closer together, the pair of divided placement support portions can be caused to face each other in close proximity by moving them toward each other in the article lateral direction to locate each of the pair of divided placement support portions at the approach limit position.

Therefore, when an article having a short length in the article lateral direction is to be transferred, the pair of divided placement support portions can be located at such positions that they face each other in close proximity and that both side portions of the bottom surface of the article can be supported and received by the pair of divided placement support portions. Thus, an article, whose length in the article lateral direction is approximately as short as the sum of the lengths, in the article lateral direction, of the pair of divided placement support portions, can be transferred.

Thus, an article transfer device is provided which can transfer articles that have as small a length in the article lateral direction as possible.

In an embodiment of the present invention, the placement support portion preferably consists only of the pair of divided placement support portions.

With such a configuration, because the placement support portion consists only of the pair of divided placement support portions, there is nothing that receives and supports a part of the bottom surface of the article other than the pair of divided placement support portions. Therefore, since there is no interfering object between the pair of divided placement support portions when they are moved toward and away from each other, it is possible to define the positions where the pair of divided placement support portions are closer to each other as the approach limit positions; thus, the pair of divided placement support portions can be moved to positions that are near where they contact each other. Therefore, articles having even shorter lengths in the article lateral direction can be transferred.

In an embodiment of the present invention, when the pair of divided placement support portions are located at the approach limit positions, a dimension of a gap formed in the article lateral direction between the pair of divided placement support portions is preferably less than the length, in the article lateral direction, of each of the pair of divided placement support portions.

With such a configuration, when the pair of divided placement support portions are located in approach limit positions, the dimension of the gap formed in the article lateral direction between the pair of divided placement support portions is less than the length, in the article lateral direction, of each of the pair of divided placement support portions. Therefore, by locating each of the pair of divided placement support portions at the approach limit position, they can be located at such positions that they face each other in close proximity and that the gap between the pair of divided placement support portions is smaller than the length, in the article lateral direction, of a divided placement support portion.

In an embodiment of the present invention, each of the pair of clamp portions and a corresponding one of the pair of divided placement support portions are preferably connected to each other so as to be movable in unison. And the clamp actuator means preferably functions also as the placement support portion actuator means.

With such a configuration, because each of the pair of clamp portions and the corresponding one of the pair of divided placement support portions which are connected to each other so as to be movable in unison can be moved toward and away from each other by the actuating means for both, the structure can be made simpler than the case where the clamp actuating means and the placement support portion actuating means are provided separately.

In an embodiment of the present invention, each of the pair of divided placement support portions preferably includes a plurality of rotary rollers which can rotate about laterally extending axes arranged along the article transfer direction. And a roller actuator means for drivingly rotating the plurality of rotary rollers is preferably provided to each of the pair of divided placement support portions so as to be movable in unison therewith.

With such a configuration, because each of the pair of divided placement support portions includes a plurality of rotary rollers that are rotated by the roller actuating means and arranged along the article transfer direction, the plurality of rotary rollers not only receive and support an article but also apply transporting action to the bottom surface of the article that is received and supported by the rollers to transport an article along the article transfer direction. Therefore, in addition to the transporting action applied in the article transfer direction by the projecting and retracting operations of the pair of clamp portions, the article is transported in the article transfer direction also by the transporting action applied on the bottom surface of the article by the plurality of rotary rollers provided to the pair of divided placement support portions. Accordingly, the article can be transported in the article transfer direction reliably and smoothly.

In an embodiment of the present invention, each of the pair of clamp portions preferably includes an article transporting endless revolving body that, when at the gripping position, contacts a lateral side of the article to be transferred and that is circulated about a vertical axis, and an circulating actuator means for circulating and driving the endless revolving body is preferably provided to each of the pair of clamp portions so as to be movable in unison therewith.

With such a configuration, because each of the pair of clamp portions includes an article transporting endless revolving body that, when at the gripping position, contacts a lateral side of the article to be transferred and that is circulated about a vertical axis, the article can be transported in the article transfer direction with the article to be transferred being gripped, as the endless revolving body is caused to be circulated with the article to be transferred being gripped by the pair of clamp portions in the gripping positions. Therefore, in addition to the transporting action in the article transfer direction by the projecting and retracting operation of the pair of clamp portions, the article is transported in the article transfer direction also by the transporting action applied on the lateral side of the article by the article transporting endless revolving bodies of the pair of clamp portions. Accordingly, the article can be transported in the article transfer direction reliably and smoothly.

A stacker crane in accordance with the present invention is one including a vertically movable platform having an article transfer device in accordance with the present invention, wherein the base platform is the vertically movable platform.

With such a configuration, since the pair of divided placement support portions of the article transfer device are provided, utilizing the vertically movable platform of the stacker crane as a base platform, the structure can be made simple with the article transfer device mounted on the vertically movable platform. Therefore, when the article transfer device in accordance with the present invention is mounted in a stacker crane, any increase in weight can be avoided to the extent possible and the stacker crane can be of light weight.

MODES FOR CARRYING OUT THE INVENTION

An embodiment is described next in which an article transfer device in accordance with the present invention is incorporated in a stacker crane in an automated warehouse with reference to the drawings.
[Automated Warehouse]

Figure 1:
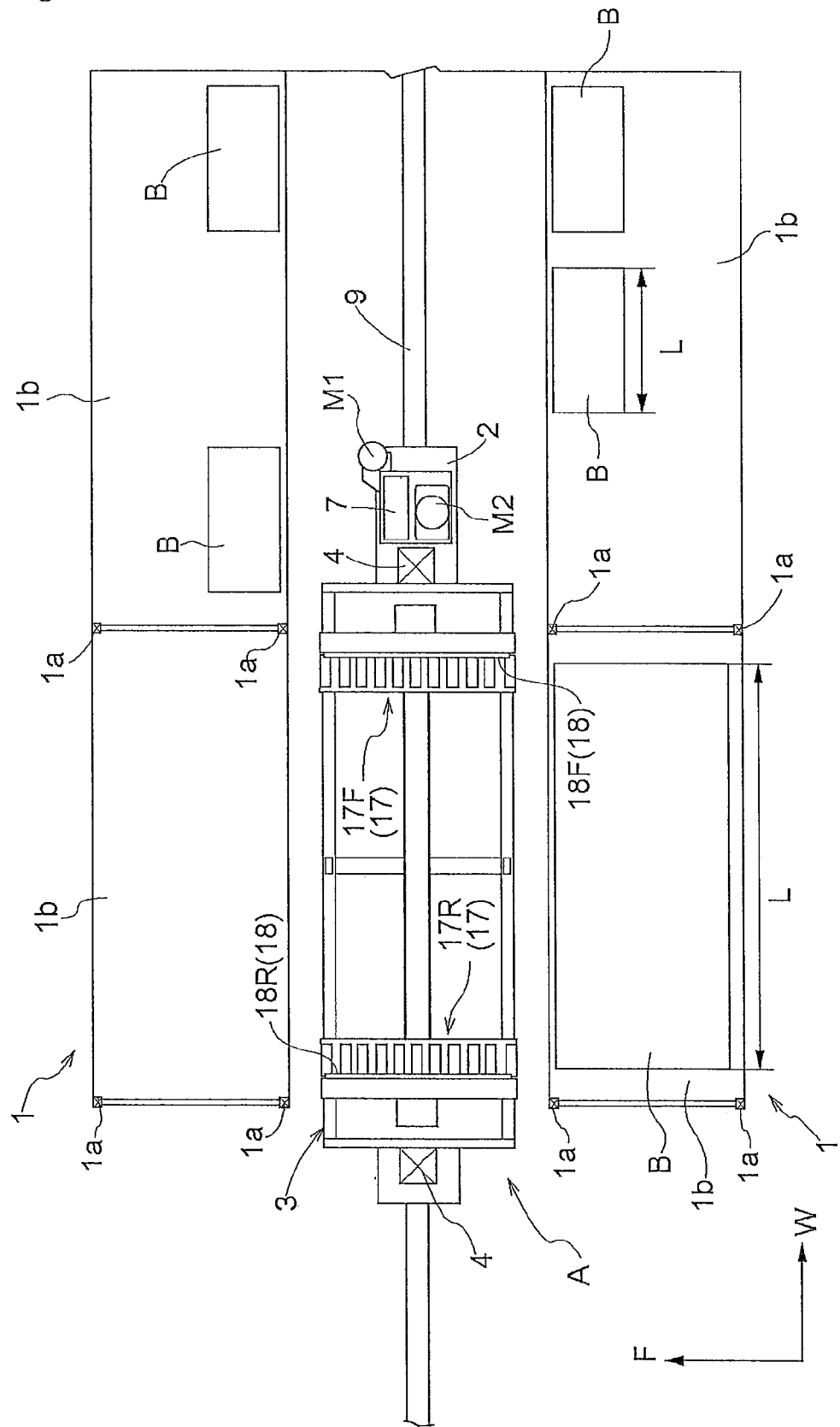
FIG. 1 is a plan view showing a stacker crane carrying an article transfer device and an article storage rack.
Figure 2:
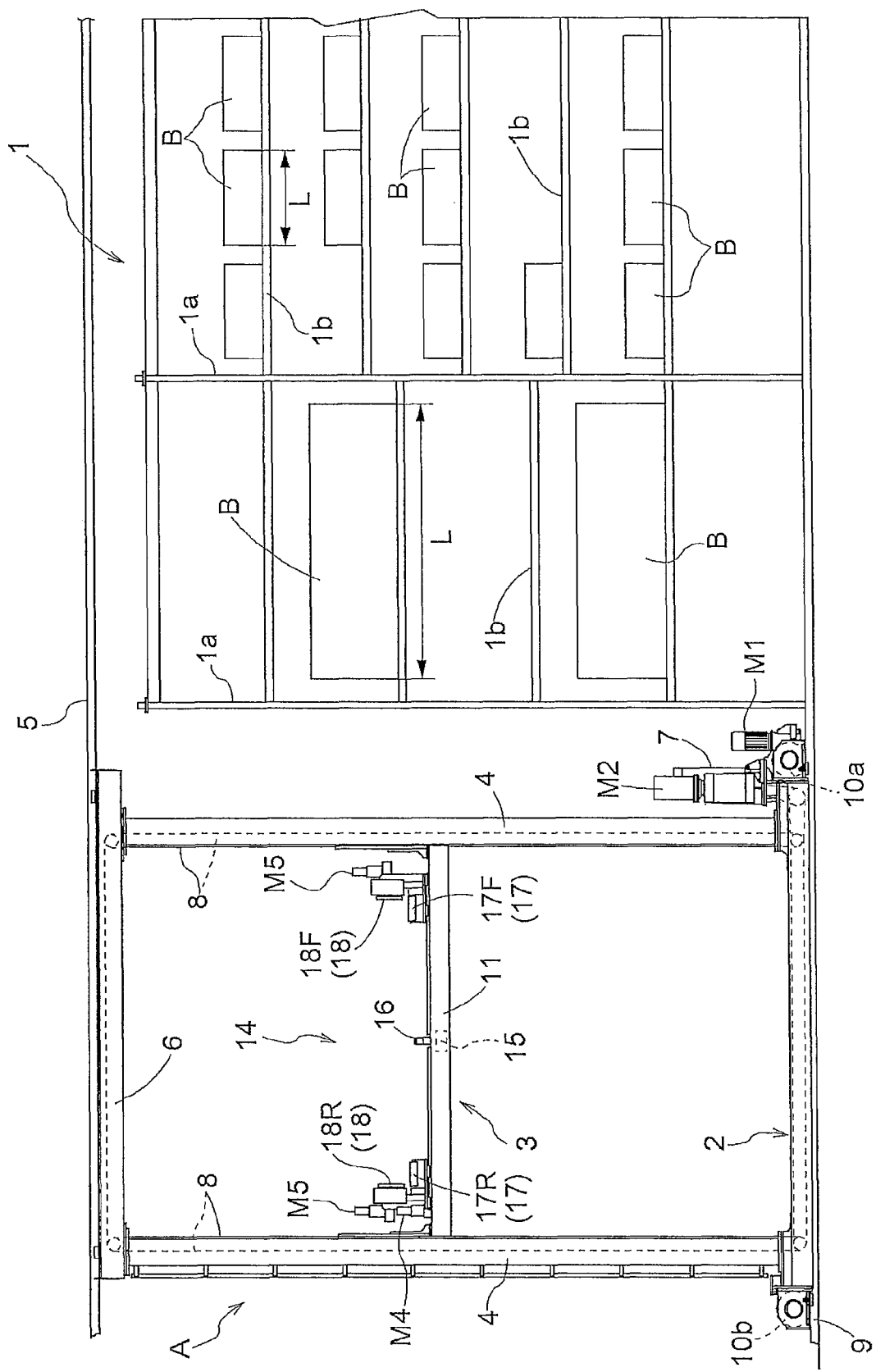
FIG. 2 is a side view showing the stacker crane carrying the article transfer device and the article storage rack.

As shown in FIG. 1 and FIG. 2, the automated warehouse is provided with two storage racks 1 which are installed such that they are spaced apart from each other and such that their respective directions along which articles are moved in and out are opposite from each other, and a stacker crane A which runs along a work path formed between the storage racks 1.
[Storage Rack]

Each article storage rack 1 includes a plurality of support columns 1a that stand vertically and are spaced apart from each other in a rack lateral width direction (direction along W in FIG. 1) and in a rack fore and aft direction (direction along F in FIG. 1), and article support boards 1b that span between a plurality of the support columns 1a arranged in the rack lateral width direction. And the article storage rack 1 is configured to store a plurality of articles with the articles B being received and supported by the article support boards 1b and with a plurality of storage locations for storing articles B being arranged or layered in the rack lateral width direction as well as in the rack vertical direction.

Provided to each article support board 1b is a plurality of storage locations each of which functions as a location for storing one article B and each of which is defined at every predetermined interval along the rack lateral width direction. Although there are two or more kinds of articles B of different size as described below, articles B having the same or approximately the same width in the rack lateral width direction are arranged in the rack lateral width direction W on each article support board 1b. In addition, each of the articles B stored in the storage locations is arranged such that its side face on the front face side of the rack (i.e., side face that faces the work path) is in alignment with the side faces of other articles with respect to the rack fore and aft direction F (see FIG. 1). The article storage rack 1 is, thus, configured to store two or more kinds of articles B having different lengths L in the article lateral direction which extends along the rack lateral width direction W.
[Articles]

Two or more kinds of articles B of different size exist with the lateral length varying from the maximum lateral length Lmax (for example, 1510 mm in the present embodiment) to the minimum lateral length Lmin (for example, 335 mm in the present embodiment). Article length along the article transfer direction (i.e., direction along the rack fore and aft direction F) is basically greater for articles with greater length L in the lateral direction. Thus, the stacker crane A transfers two or more kinds of articles B having different lengths in the article lateral direction which is perpendicular to the article transfer direction.

The articles B in present embodiment are preferably plastic containers for storing parts for manufacturing devices, or work-in-process, etc. General purpose plastic material, such as polypropylene (PP) and polyvinyl chloride (PVC) or engineering plastic material, such as polycarbonate (PC) and polyethylene terephthalate (PET) is used as the material for the container. Although the rigidity of the container is high, the material used is not limited to these materials. And it is also possible to use metal as the material for the containers. In addition, ribs are formed in, among other places, the bottom surface of the container to reinforce rigidity so that it is not easily bent or otherwise deformed due to the weight of its content during the transfer onto the article support board 1b.
[Stacker Crane]

As shown in FIG. 1 and FIG. 2, the stacker crane A has a pair of support columns 4 which guide and support the vertically movable platform 3 such that the platform 3 can be moved vertically and which are mounted to the traveling carriage 2—which runs along a single travel rail 9 installed in the work path—at a front position and a back position respectively in a crane travel direction along the rack lateral width direction W so that the support columns 4 are spaced apart from each other. The upper end portions of the support columns 4 are connected to each other by an upper frame 6 which is guided and supported by an upper guide rail 5 installed in the upper area of the work path.

In addition, the traveling carriage 2 has, at a front position and a back position in the crane travel direction with a distance therebetween, travel wheels 10a and 10b which are supported by and roll on a top face of the travel rail 9, and a pair of right and left guide rollers (not shown) which are located near the travel wheels 10a and 10b such that the guide rollers press on the travel rail 9 from right and left directions and roll along the side faces of the travel rail 9. The traveling carriage 2 further includes, among other things, a travel electric motor M1 for actuating driving wheels 10a which are either the travel wheels 10a or the travel wheels 10b, a control device 7 for controlling the stacker crane, a laser travel range finder (not shown) for detecting the travel position of the traveling carriage 2 in the work path by measuring the distance from a reference position defined on the ground side, a laser vertical range finder (not shown) for detecting the vertical position of the vertically movable platform 3 in the vertical movement path, and an electric power collector (not shown) for receiving electric power for the operation of the stacker crane. With such a configuration, stacker crane A is configured to travel automatically along the travel rail 9 as it driven by the travel electric motor M1 while being prevented from falling down sideways by the upper frame 6. Each of the control device and a controller, etc. described in this specification includes all or some of the components which a conventional computer has, including a CPU, memory, a communication unit, etc. and has algorithms, that are required to perform the functions described in this specification, stored in memory.

Figure 3:
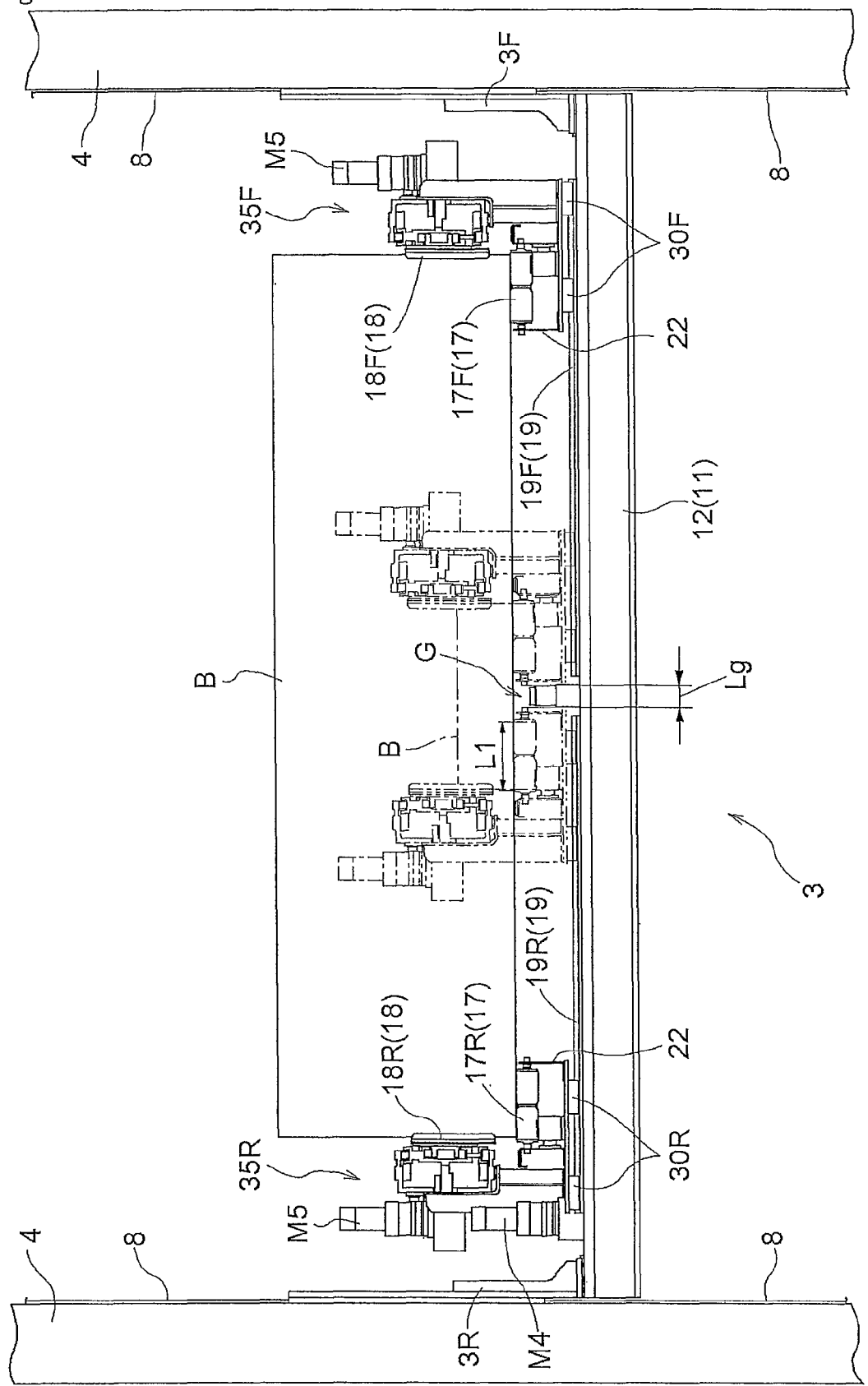
FIG. 3 is a side view of a vertically movable platform carrying the article transfer device.
Figure 4:
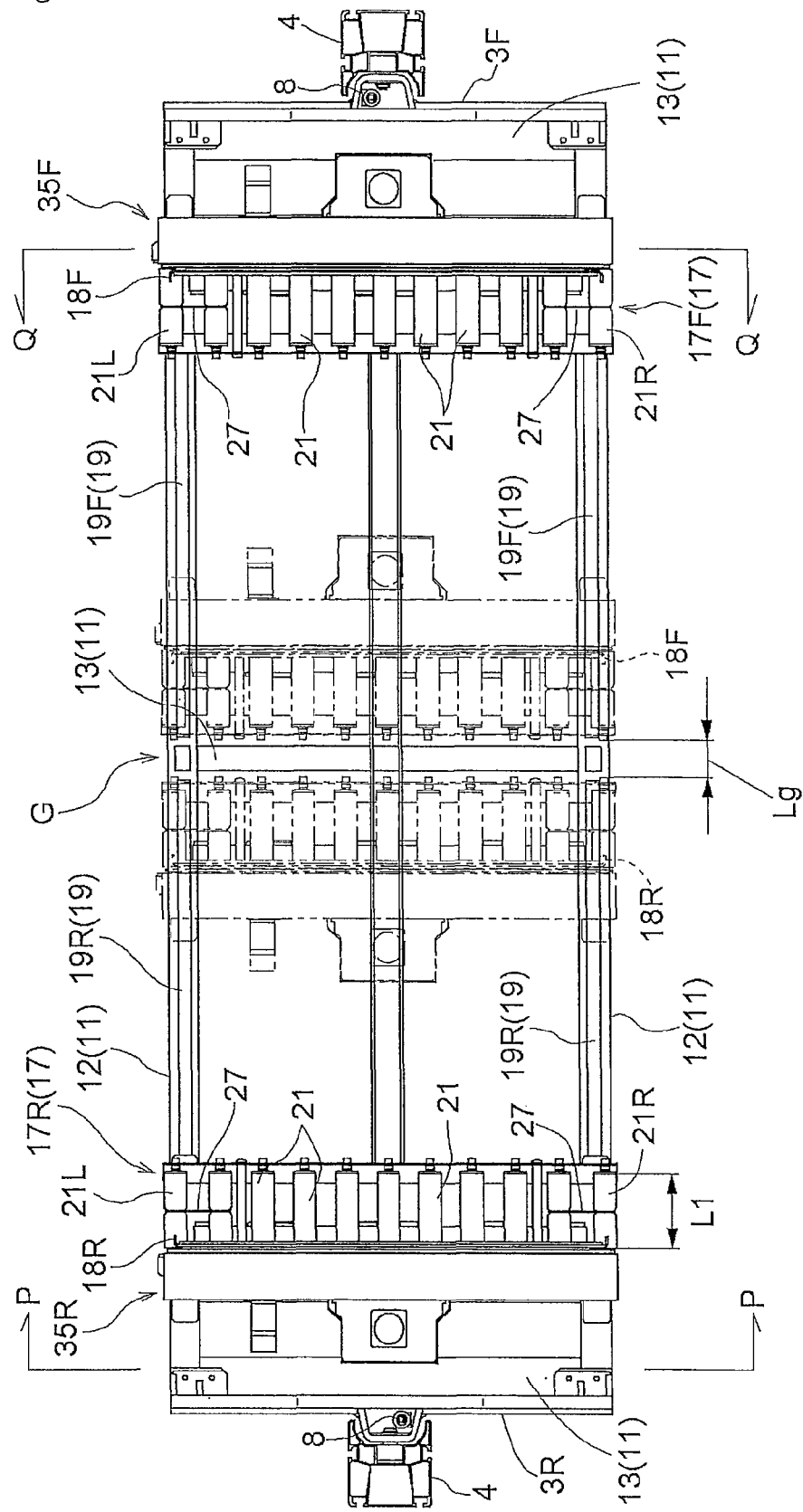
FIG. 4 is a plan view of the vertically movable platform carrying the article transfer device.
Figure 8:
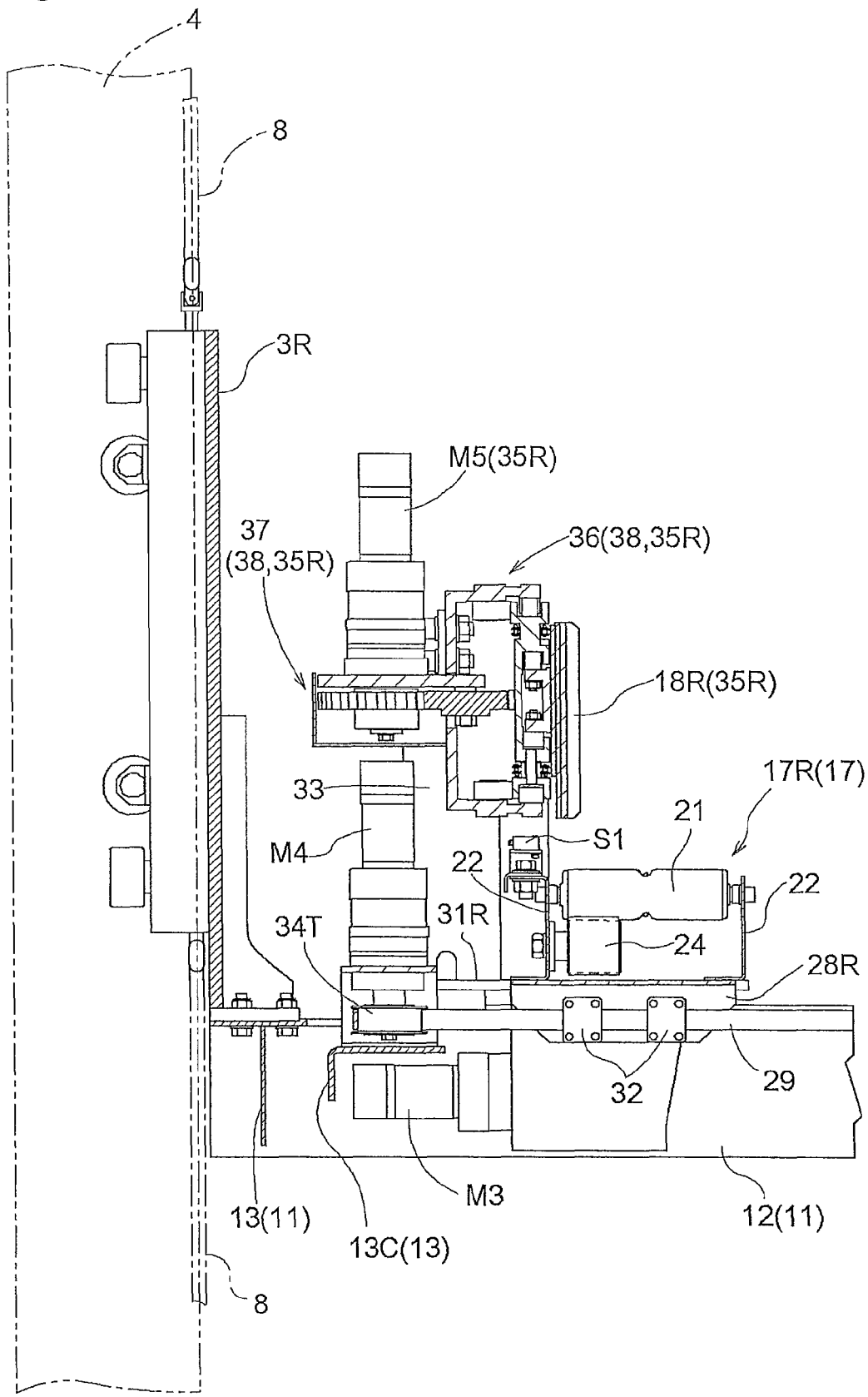
FIG. 8 is a vertical sectional side view showing a backside clamp unit and a backside placement support portion.

As shown in FIG. 3, FIG. 4, and FIG. 8, the vertically movable platform 3 includes a pair of vertical movement brackets 3F and 3R (front side vertical movement bracket 3F and backside vertical movement bracket 3R) which are guided by guide rail portions formed respectively in the pair of support columns 4 and which are located at the front and back ends in the crane travel direction. A frame 11 that functions as a vertically movable platform main body is connected to the pair of vertical movement brackets 3F and 3R, and an article transfer device 14 for transferring an article B between itself and a transfer target location is mounted on the frame 11. That is, the stacker crane A includes the article transfer device 14.

Figure 5:
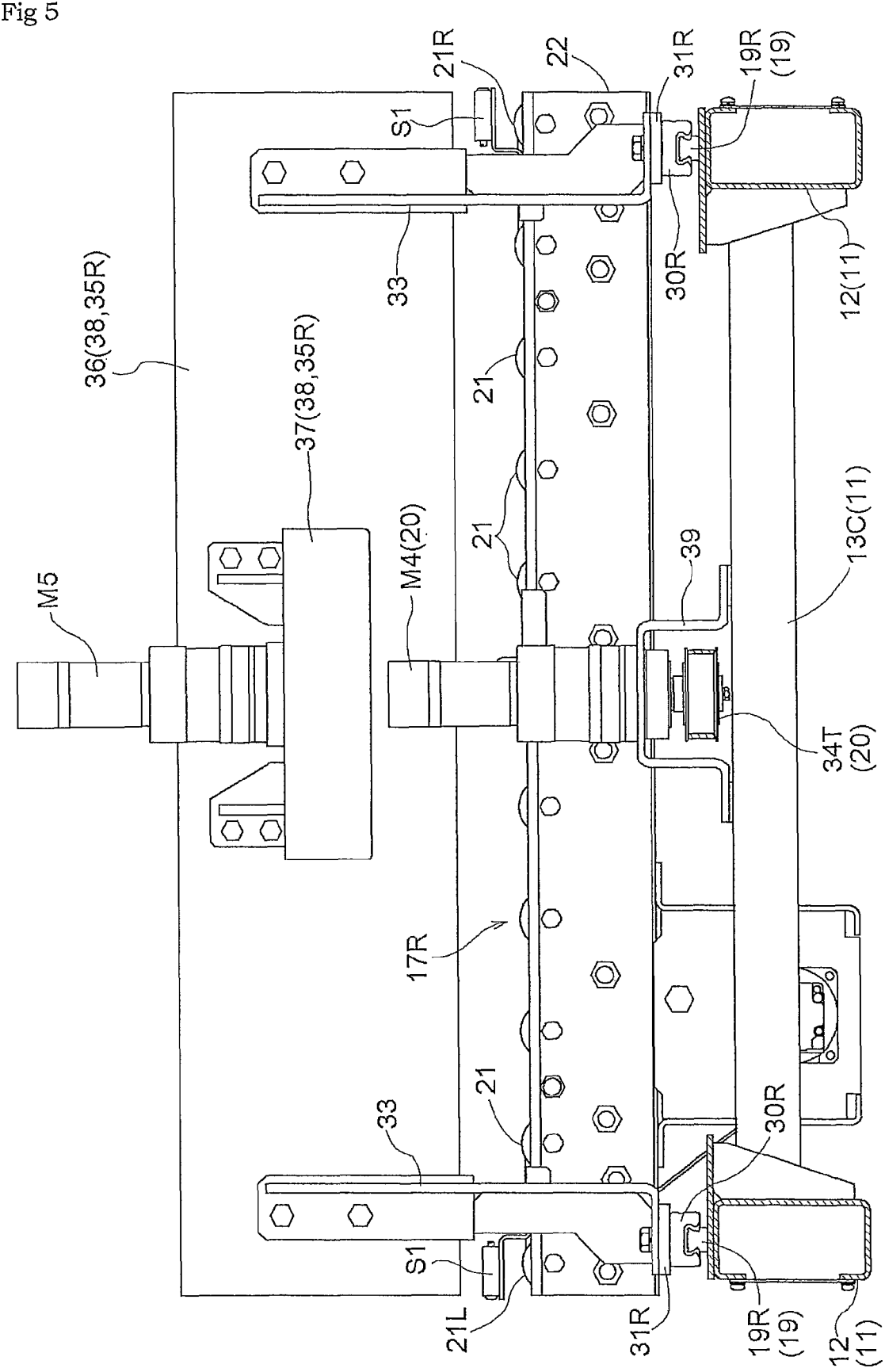
FIG. 5 is a cross-sectional rear view as seen along the arrows P-P in FIG. 4.
Figure 7:
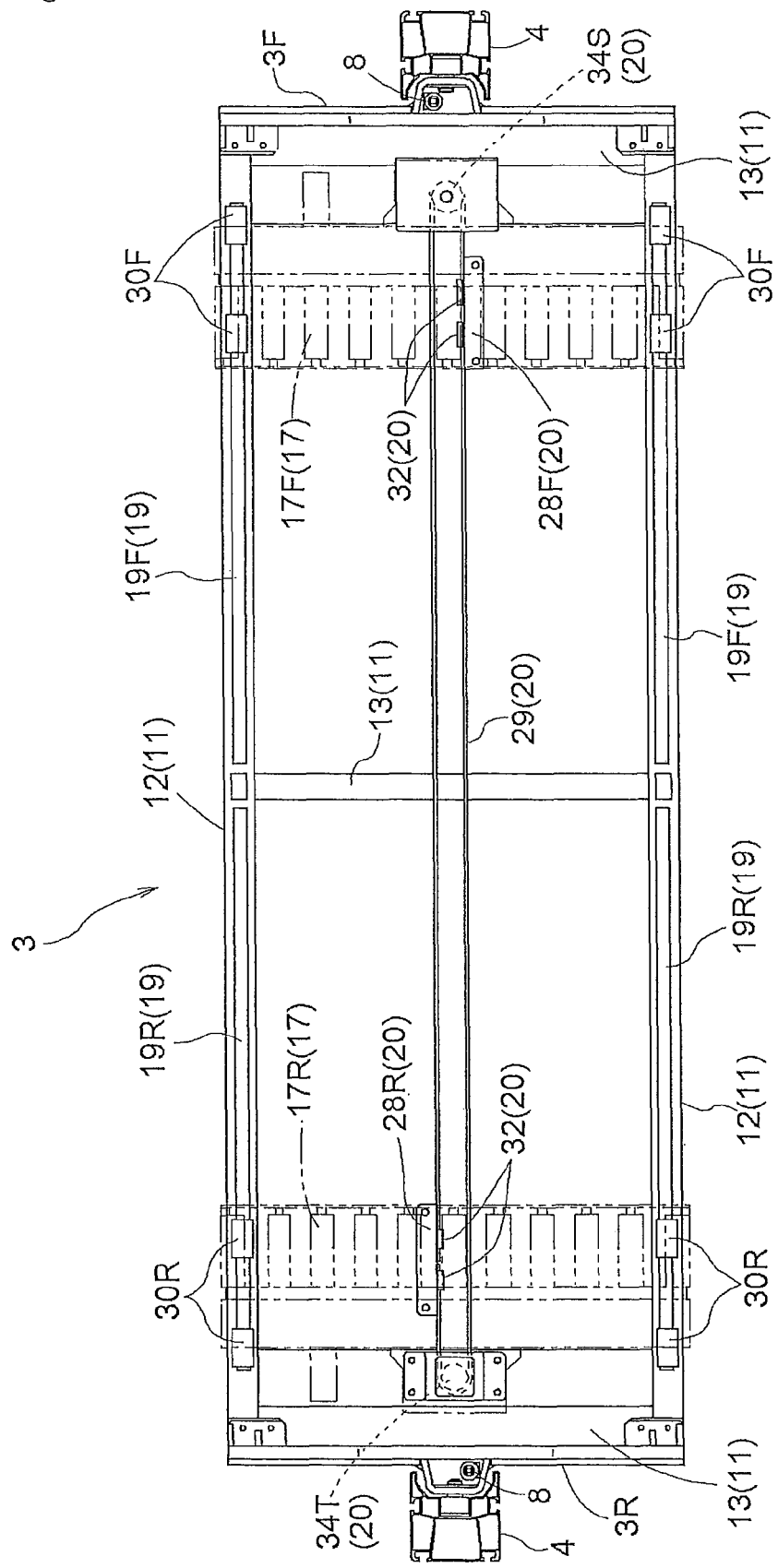
FIG. 7 is a partially transparent view showing a centering mechanism.

As shown in FIG. 5 and FIG. 7, the frame 11 of the vertically movable platform 3 includes, among other things, a pair of main frames 12 that extend along the crane travel direction and that are spaced apart from each other in a crane lateral direction (right and left direction) along the rack fore and aft direction F, and a plurality of connecting frames 13 that connect the main frames 12 at three locations including a central part and the front and back end portions in the crane travel direction. As shown in FIG. 2, mounted at fore-and-aft central locations of the pair of main frames 12 are on-rack article detection sensors 15 for detecting the presence of an article currently in the storage location of the article support board 1b to prevent two articles to be transferred to the same location, and support board detection sensors 16, for detecting an end face of the article support board 1b that is on the side of the work path, so located that the sensing directions point toward each of the pair of article storage racks 1.

As shown in FIG. 2, a pair of vertical movement driving chains 8 are connected to the pair of vertical movement brackets 3F and 3R so that the pair of vertical movement brackets 3F, 3R and the frame 11 are suspended and supported by them. The pair of vertical movement driving chains 8: have one ends connected to upper portions of the pair of vertical movement brackets 3F and 3R respectively; run over guide sprockets provided to the upper frame 6, over a guide sprocket provided to one of the support columns 4, and over driving sprockets (not shown) provided at one end of the traveling carriage 2; and have the other ends connected to lower portions of the pair of vertical movement brackets 3F and 3R. And the vertically movable platform 3 is configured to be raised and lowered with the feeding out operation and spooling operation of the vertical movement driving chains by drivingly rotating the drive sprockets in one direction and its opposite direction with the vertical movement electric motor M2.

A ground side controller (not shown) which issues commands for taking articles into and out of the racks is installed in one end area of the work path for the stacker crane A. When a command to take an article into a rack or out of a rack is issued from this ground side controller, the control device 7 mounted in the stacker crane A controls the traveling operation of the traveling carriage 2, the vertical movement operation of the vertical movement carriage 3, and the transfer operation of the article transfer device 14 based on detected information from various sensors such as the laser travel range finder, laser vertical range finder, on-rack article detection sensor 15, support board detection sensor 16. Thereby, the stacker crane A performs a take-in transporting operation in which an article B is transported from a take-in-and-out conveyer (not shown) provided in an end portion of the article storage rack 1 to a storage location defined on an article support board 1b in an article storage rack 1, and a take-out transporting operation in which an article B is transported from a storage location defined on an article support board 1b in an article storage rack 1 a to the take-in-and-out conveyer. In addition, the take-in commands and the take-out commands are transmitted to the control device 7 from the ground side controller by an optical transmission device using infrared transmission. A control command issued by the control device 7 concerning transfer control is transmitted to a control terminal provided in the vertically movable platform 3 from the control device 7 by an optical transmission device using infrared transmission.

Details on the article transfer device 14 provided on the frame 11 of the vertically movable platform 3 are described next.

Figure 9:
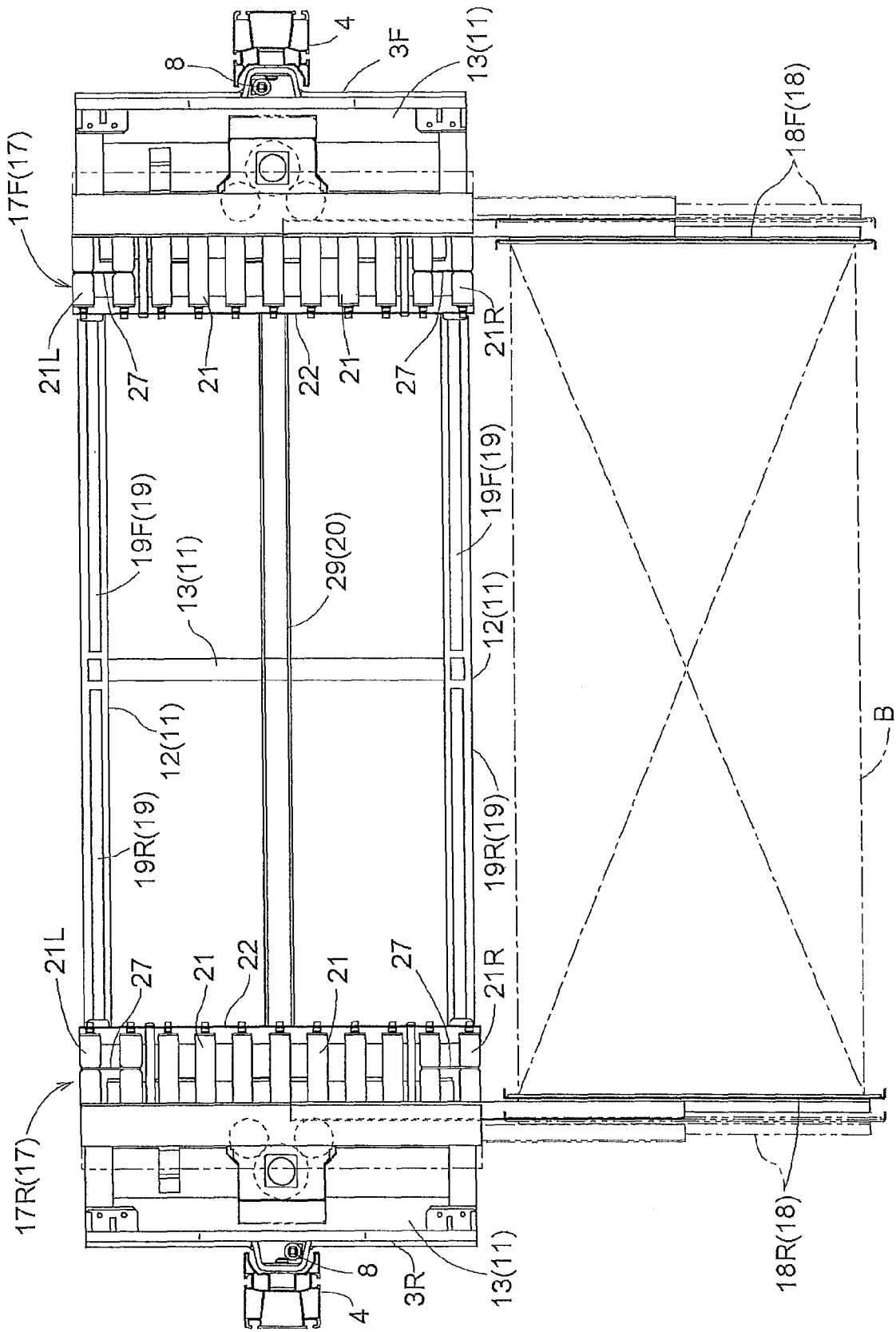
FIG. 9 is a plan view for describing an operating state of the pair of clamp portions.

As shown in FIGS. 2 to 4, the article transfer device 14 includes a placement support portion 17 for receiving and supporting an article B to be transferred, and a pair of clamp portions 18 consisting of a front side clamp portion 18F and a back side clamp portion 18R that can be projected and retrieved with respect to the placement support portion 17 along the rack fore and aft direction (crane lateral direction) which is the article transfer direction and that can be moved toward and away from each other between gripping positions (positions along the crane travel direction shown with solid lines in FIG. 9) in which the article B to be transferred is gripped and releasing positions (positions along the crane travel direction shown with imaginary lines in FIG. 9) spaced apart wider than the gripping positions.

The placement support portion 17 includes a front side placement support portion 17F for receiving and supporting a front side portion, in the crane travel direction, of the bottom surface of the article B to be transferred and a back side placement support portion 17R for receiving and supporting a back side portion, in the crane travel direction, of the bottom surface of the article B to be transferred. That is, the placement support portion 17 includes a pair of divided placement support portions 17F and 17R for separately receiving and supporting both side portions (both side portions in the crane travel direction), in the article lateral direction, of the bottom surface of the article B to be transferred. And since only the both side portions, in an article lateral direction, of the article B to be transferred are supported by the pair of divided placement support portions 17F and 17R in the present embodiment, the placement support portion 17 consists only of the pair of divided placement support portions 17F and 17R.

Each of the front side placement support portion 17F and the back side placement support portion 17R can be moved along the crane fore and aft direction with respect to the main frame 12 of the frame 11 of the vertically movable platform 3. That is, in the present embodiment, the base platform to which the pair of divided placement support portions 17F and 17R are provided is the frame 11 of the vertically movable platform 3.

As shown in FIG. 3 and FIG. 4, each of the pair of divided placement support portions 17F and 17R have a plurality of rotary rollers 21 which can rotate about laterally extending axes (axes extending in the horizontal direction and in the rack lateral width direction W, i.e., the crane travel direction) arranged along the article transfer direction.

Figure 6:
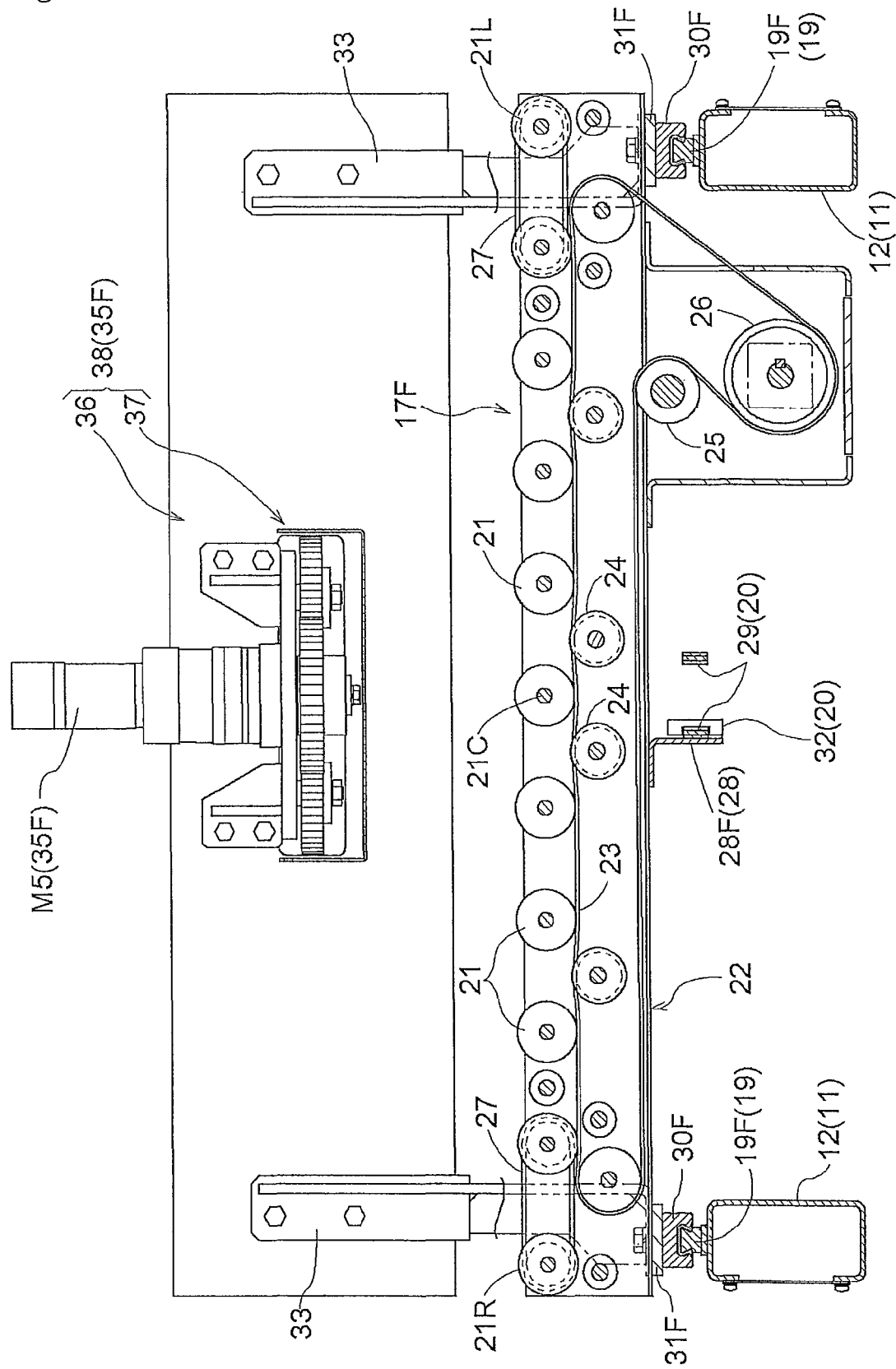
FIG. 6 is a partial cross-sectional front view as seen along the arrows Q-Q in FIG. 4.

To describe in more detail, taking the front side placement support portion 17F shown in FIG. 6 as an example, a plurality of the rotary rollers 21 are arranged in the article transfer direction with both ends of the pivot shafts 21C rotatably supported by a pair of roller support plates 22 that are spaced apart from each other in the direction that is perpendicular to the article transfer direction and that are long in the article transfer direction (see FIG. 8). Arranged below the plurality of rotary rollers 21 is a conveyor driving belt 23 that contacts the lower part side portion of all the rotary rollers 21 except the two rotary rollers 21, i.e., a left end roller 21L and a right end roller 21R which are located in either end in the article transfer direction. A plurality of pressing rollers 24 for pressing the conveyor driving belt 23 into reliable contact with the lower part side portion of the rotary rollers 21 are provided along the article transfer direction and within the loop of the conveyor driving belt 23. And a tension roller 25 for adjusting the tension of the conveyor driving belt 23 is provided outside of the loop of the conveyor driving belt 23.

And the conveyor driving belt 23 is moved over the rollers by drivingly rotating the conveyor motor M3 to drivingly rotate the driving roller 26, which drivingly rotate the plurality of rotary rollers 21 simultaneously. In addition, as for the two rotary rollers 21, namely the left end roller 21L and the right end roller 21R, a rotary roller 21 located next to the respective one of the two rotary rollers 21 is connected directly to the respective one by a transmission belt 27 so that a rotational force is transmitted from the rotary roller 21.

As shown in FIGS. 5, 6, and 8, the conveyor motor M3 and the driving rollers 26 are attached below the pair of roller support plates 22 in the front side placement support portion 17F and form a unit structure so that they can move in unison with the front side placement support portion 17F. That is, the conveyor motor M3 which drivingly rotates all of the plurality of rotary rollers 21 is provided to the front side placement support portion 17F such that the motor M3 can move in unison with the front side placement support portion 17F.

While the front side placement support portion 17F is described above, a conveyor motor M3 which can move in unison with the backside placement support portion 17R is similarly configured to drivingly rotate all of the plurality of rotary rollers 21 of the backside placement support portion 17R. Thus, the conveyor motor M3 that functions as a roller actuator for drivingly rotating all of the plurality of rotary rollers 21 is provided to each of the pair of the divided placement support portions 17F and 17R for movement therewith.

The main frames 12 in the frame 11 of the vertically movable platform 3 are rectangular pipes in a sectional view as shown in FIGS. 5 and 6. And as shown in FIGS. 3, 4, and 7, the guide rails 19 are located on their top surfaces with each guide rail 19 divided into a forward portion and a backward portion in the crane travel direction. That is, a front side guide rail 19F is placed on the top surface of a front side area in the crane travel direction of each of the pair of main frames 12 and a back side guide rail 19F is placed on the top surface of a back side area in the crane travel direction of each of the pair of main frames 12. That is, a pair of front side guide rails 19F and a pair of backside guide rails 19R are arranged forward and backward in the crane travel direction on the frame 11 of the vertically movable platform 3 with a total of four guide rails 19 provided thereon.

As shown in FIG. 6, the front side placement support portion 17F is mounted on a pair of front side base plates 31F which connect the lower portion of the pair of roller support plates 22 at both end locations in the article transfer direction, i.e., at locations above the pair of front side guide rails 19F. And a pair of front side slide blocks 30F that are guided by the front side guide rails 19F are provided on each of the back surfaces of the pair of front side base plates 31F such that the blocks 30F are spaced apart from each other in the fore and aft direction. Therefore, the front side placement support portion 17F is guided by the pair of front side guide rails 19F by means of a total of four front side slide blocks 30F attached under the pair of front side base plates 31F to which the support portion 17F is attached and which are located at both end locations in the article transfer direction.

Similarly, as shown in FIG. 5, the back side placement support portion 17R is guided by the pair of back side guide rails 19R by means of a total of four back side slide blocks 30F attached under the pair of back side base plates 31R to which the support portion 17R is attached and which are located at both end locations in the article transfer direction.

Thus, the front, back, right, and left front side slide blocks 30F of the front side placement support portion 17F are guided by the pair of the front side guide rails 19F, and the front, back, right, and left back side slide blocks 30R of the back side placement support portion 17R are guided by the pair of the back side guide rails 19R. And the front side placement support portion 17F and the back side placement support portion 17R are synchronously moved in opposite directions by a centering mechanism 20 described below.

Thus, the front side placement support portion 17F and the back side placement support portion 17R can be moved between near positions (approach limit positions) and spaced apart positions (spaced-apart limit positions) within the limits of the movable range whose ends are defined by the spaced-apart limit positions (positions of the front side placement support portion 17F and the backside placement support portion 17R shown with solid lines in FIGS. 3 and 4) in which the front side placement support portion 17F is located at a front side end location of the pair of front side guide rails 19F and the back side placement support portion 17R is located at a back side end location of the pair of the back side guide rails 19R, and the approach limit positions (positions of the front side placement support portion 17F and the back side placement support portion 17R shown with phantom lines in FIGS. 3 and 4) in which the front side placement support portion 17F is located at a back side end location of the pair of front side guide rails 19F and the back side placement support portion 17R is located at a front side end location of the pair of the back side guide rails 19R.

And when the front side placement support portion 17F and the back side placement support portion 17R are located at the approach limit positions, the ends of the plurality of rotary rollers 21 provided to each of the pair of divided placement support portions 17F and 17R are moved close to each other to the positions in which the ends face one another. And when the pair of divided placement support portions 17F and 17R are located at the approach limit positions, the dimension Lg (for example, 45 mm in the present embodiment)—in the article lateral direction—of the gap G formed between the pair of divided placement support portions 17F and 17R is smaller than the length L1 (for example, 150 mm in the present embodiment)—in the article lateral direction—of each of the the pair of divided placement support portions 17F and 17R. Thus, the front side placement support portion 17F and the back side placement support portion 17R are configured to face each other in close proximity when they are located at the approach limit positions which are limit positions in the movable range that are closer to each other. The length L1, in the article lateral direction, of each divided placement support portions 17F or 17R may be defined as the dimension in the article lateral direction over which each of the support portions contacts the bottom surface of the article, and, for example, may be defined in the present embodiment as the length, in the article lateral direction, of the rotary rollers 21. Therefore, the article transfer device 14 of the present embodiment is not constrained by any central support for supporting the central location of the bottom surface of the article B as is with an article transfer device having a conventional structure; thus, the positions of the front side placement support portion 17F and the back side placement support portion 17R may be brought sufficiently close together.

Thus, with this article transfer device 14, both side portions of the bottom surface of the article B can be supported by the front side placement support portion 17F and the back side placement support portion 17R by adjusting the positions of the front side placement support portion 17F and the back side placement support portion 17R within the movable range between the spaced apart limit positions and approach limit positions depending on the length of the article in the lateral direction. And even an article that is short in the article lateral direction and that could not be transferred by a conventional device can be transferred by bringing the front side placement support portion 17F and the back side placement support portion 17R to the approach limit positions.

As shown in FIGS. 7 and 8, the centering mechanism 20 includes a front side moving operation member 28F provided to connect the pair of roller support plates 22 of the front side placement support portion 17F at their lower portions, a back side moving operation member 28R provided to connect the pair of roller support plates 22 of the bac1 side placement support portion 17R at their lower portions, a centering belt 29 that is circulated along a circulating path set up horizontally and parallel to the frame 11 of the vertically movable platform 3 and that moves the front side moving operation member 28F and the back side moving operation member 28R in opposite directions to each other along the direction that is perpendicular to the article transfer direction, a centering motor M4 for driving and circulating the centering belt 29, a timing pulley 34T provided to an output shaft of the centering motor M4, and a driven pulley 34S arranged in the frame 11 at a location that is opposite the timing pulley 34T in the direction that is perpendicular to article transfer direction.

As shown in FIGS. 5 and 7, each of the timing pulley 34T and the driven pulley 34S is attached to a respective one of a pair of connecting frames 13C for attaching the centering mechanism and spanning between the pair of main frames 12 of the frame 11 by means of a bracket 39.

As shown in FIG. 7, the front side moving operation member 28F and the back side moving operation member 28R are fixed to one and the other respectively of the two belt portions of the centering belt 29 that extend in parallel to each other, by means of coupling members 32. Therefore, when the centering belt 29 is circulated, the front side moving operation member 28F and the back side moving operation member 28R are moved in mutually opposite directions; thus, the front side placement support portion 17F and the back side placement support portion 17R move in the mutually opposite directions while guided by the guide rails 19.

Since the centering motor M4 drivingly rotates the timing pulley 34T thereby circulating the centering belt 29 which consists of a timing belt that meshes with this timing pulley 34T and the driven pulley 34S which is located opposite the timing pulley 34T, the control device 7 described above can control the near-each-other positions and the spaced-apart positions of the front side placement support portion 17F and the back side placement support portion 17R depending on the length, in the lateral direction, of the article B by controlling the number of rotations of the centering motor M4 based on length information of the article B in the article lateral direction.

Further, in the present embodiment and as shown in FIGS. 3 and 6, a front side clamp unit 35F described below and having a front side clamp portion 18F is attached integrally by means of the clamp attachment bracket 33 to the pair of front side base plates 31F to which the front side placement support portion 17F is attached. Since the front side placement support portion 17F and the front side clamp unit 35F are attached to the same pair of front side base plates 31F, the front side clamp portion 18F is also moved in unison with the front side placement support portion 17F when the centering motor M4 is actuated to move the front side placement support portion 17F.

Similarly, as shown in FIG. 3 and FIG. 5, a back side clamp unit 35R described below and having a back side clamp portion 18R is attached integrally by means of the clamp attachment bracket 33 to the pair of back side base plates 31R to which the back side placement support portion 17R is attached. Since the back side placement support portion 17R and the back side clamp unit 18R are attached to the same pair of back side base plates 31R, the back side clamp portion 18R is also moved in unison with the back side placement support portion 17R when the centering motor M4 is actuated to move the front side placement support portion 17R.

Thus, each of the pair of clamp portions 18F and 18R and the respective one of the pair of divided placement support portions 17F and 17R are connected to each other so that they can move in unison. And the centering motor M4 functions both as a clamp actuator for moving the pair of clamp portions 18F and 18R toward and away from each other and as a placement support portion actuator for moving the pair of divided placement support portions 17F and 17R toward and away from each other.

In addition, the centering motor M4 is controlled not only by position control but by a torque control by the control device 7. This is because the driving torque of the centering motor M4 is controlled in order to control the gripping pressure when gripping the article B by the pair of clamp portions 18F and 18R, in addition to controlling the near-each-other positions and spaced apart positions of the pair of clamp portions 18F, 18R and the pair of divided placement support portions 17F, 17R depending on the length of the lateral direction of the article B. Such torque control described in such this specification is performed through conventional technology for a given type of motor, such as a control based on the relationship between the applied direct current voltage or alternating-current frequency and the rotation rate of the motor, or a control using an encoder feedback, etc.

The configuration of the pair of clamp portions 18F and 18R will be described next, taking the back side clamp portion 18R as an example. The back side clamp portion 18R is provided to the back side clamp unit 35R connected to the pair of back side base plates 31R. The back side clamp unit 35R includes a projecting-retracting operation portion 38 having a three-stage slide fork 36 and a transmission gear mechanism 37, a fork motor M5 for both projecting this projecting-retracting operation portion 38 in one direction and retracting it in the opposite direction, and the back side clamp portion 18R which is attached to a primary fork of the slide fork 36 and is a plate-shaped member that is long in the article transfer direction (direction along which the fork is projected and retracted), and which has engaging claws formed at both ends for engaging corner portions of the article B.

[Control Configuration]

The control device 7 controls the operation of the centering motor M4 that functions as a clamp actuator as well as the placement support portion actuator based on the length information in the article lateral direction of an article B to be transferred. In addition, the control device 7 controls the rotation of the conveyor motor M3 which functions as a roller actuator as well as the rotation of the fork motor M5 which functions as a clamp projecting and retracting actuator, based on the end position information, in the article transfer direction, of the article B to be transferred and detected by out-of-bounds sensors S1 (see FIGS. 5 and 7) or a positioning sensor (not shown).

When an article take-in command is issued from the ground side controller, the control device 7 receives the position information along the crane travel direction and the position information along the crane vertical movement direction about the transfer location in the take-in-and-out conveyer which is designated as the transport origin and a storage location in the article storage rack 1 which is designated as the transport destination as well as length information, in the article lateral direction, of the article B to be transferred, from the take-in command.

In addition, when an article take-out command is issued from the ground side controller, the control device 7 receives the position information in the crane travel direction and the position information along the crane vertical movement direction about a storage location in the article storage rack 1 which is designated as the transport origin and the transfer location in the take-in-and-out conveyer which is designated as the transport destination as well as length information, in the article lateral direction, of the article B to be transferred, from the take-out command.

In addition, the transfer operation of the article transfer device 14 is different depending on whether it is at the transport origin or is at the transport destination and is either an unloading transfer (i.e., transfer for delivering an article) or a scooping transfer (namely, transfer for receiving the article). Therefore, when receiving the position information in the crane vertical movement direction about the transport origin or the transport destination from the take-in command or the take-out command, the control device 7 is configured to receive position information which indicates a position that is higher by a set height (for example, 30 mm), when a command is issued specifying a storage location or a transfer location as a transport destination where unloading transfer is to be performed, than the position in the case where the command specifies a storage location or the transfer location as a transport origin where a scooping transfer is to be performed.

The position information along the crane travel direction, and position information along the crane vertical movement direction may be given from the ground side controller directly to the control device 7 through command information. And position ID information may be given in the command information from the ground side controller and the control device 7 may acquire the position information by looking up a position information table based on the position ID information. Similarly, the length information in the article lateral direction may be given from the ground side controller directly to the control device 7 through command information. And article kind ID information may be given in the command information from the ground side controller and the control device 7 may acquire the length information in the article lateral direction by looking up an article lateral length table based on the article kind ID information.

A control action of the control device 7 is described next, taking an example of a case in which an article take-in command is issued where a certain article B is to be transported from a transport origin which is the transfer location in the take-in-and-out conveyer to a transport destination which is a storage location in the article storage rack 1. The following description assumes that the stacker crane A was in a standby state until the take-in command was issued.

The control device 7 controls the operations of the travel electric motor M1 and the vertical movement electric motor M2 based on detected information from the laser travel range finder and the laser vertical range finder in order to move the article transfer device 14 to the scooping position (receiving position) at the transfer location in the take-in-and-out conveyer specified as the transport origin in the take-in command. And while the traveling operation and the vertical movement operation to the transport origin are in progress, the operation of the centering motor M4 is controlled based on the length information, in the article lateral direction, of the article B to be transferred and obtained based on the take-in command to move the pair of clamp portions 18F and 18R to the releasing positions for the article B to be transferred. In the present embodiment, the releasing positions are set to be such positions that the difference between the distance between the pair of clamp portions 18F and 18R and the length L, in the article lateral direction, of an article B to be transferred (sum of the clearances formed in the article lateral direction) is smaller than the length or dimension in the article lateral direction of one of the pair of divided placement support portions 17F and 17R. This allows the article B to be received and supported accurately by the pair of divided placement support portions 17F and 17R even when the center of the article B in the article lateral direction deviates or is displaced somewhat from the center of the pair of divided placement support portions 17F and 17R.

When the article transfer device 14 is located at the scooping position for the transport origin, an operation request information for the take-in-and-out conveyer is transmitted to the ground side controller to have the take-in-and-out conveyer operated toward the article take-in side, after checking the presence of the article B to be transferred located at the transfer location in the take-in-and-out conveyer based on the detected information from the on-rack article detection sensor 15. Simultaneously, the conveyor motor M3 of the front side placement support portion 17F and the conveyor motor M3 of the back side placement support portion 17R are caused to operate toward the article retrieving side. In addition, the rotation operating speed of the drive motor of the take-in-and-out conveyer and the rotation operating speed of each conveyor motor M3 of the pair of divided placement support portions 17F and 17R are controlled by the control terminal of the take-in-and-out conveyer and the control device 7 such that the transporting speed of the article B as it is transported by the take-in-and-out conveyer is in synchronization with, or matches, the transporting speed of the article B as it is transported by the plurality of rotating rotary rollers 21 provided to each of the pair of divided placement support portions 17F and 17R.

The positioning of the article B—that is transported from the transfer location in the take-in-and-out conveyer over to the article transfer device 14 of the stacker crane A by the transporting action of the take-in-and-out conveyer and the pair of divided placement support portions 17F and 17R—is controlled based on the combination of the detected information from the out-of-bounds sensor S1 and the positioning sensor such that the article's end face is located in an outward end of the article transfer device 14 in the article transfer direction. That is, it is determined which of the right and left article storage racks 1 with respect to the crane travel direction of the stacker crane A, the storage location in the article storage rack 1 as a transport destination specified in the take-in command belongs to. If, for example, the transport destination is a storage location that belongs to the left hand side article storage rack 1 with respect to the crane travel direction, then the mounting position of the article B in the article transfer direction in the pair of divided placement support portions 17F, 17R is controlled such that the right hand side face of the article B with respect to the crane travel direction is located in the right hand side end of the article transfer device 14. When unloading articles B to the storage locations in the article storage rack 1 specified as transport destinations, the articles B can be stored in the storage locations on the article support board 1B with the side faces, on the side of the work space, of all the articles B being in line or flush with one another, simply by projecting the pair of clamp portions 18F, 18R by a fixed stroke regardless of the size of the article B.

When an article B to be transferred is fully received and supported by the pair of divided placement support portions 17F, 17R, the centering motor M4 is controlled in the torque control mode in order to switch the pair of clamp portions 18F, 18R to the gripping position from the releasing position. That is, taking advantage of the fact that the driving torque of the centering motor M4 increases when the pair of clamp portions 18F, 18R are moved to the gripping positions for gripping the article B from the releasing positions, the centering motor M4 is kept rotating in the direction which would move the clamp portions closer together from the state in which the pair of clamp portions 18F, 18R are in the releasing positions while maintaining the driving torque of the centering motor M4 at the target torque that is set to be greater than the driving torque at which the pair of clamp portions 18F, 18R can be moved: and the operation of the centering motor M4 is stopped when it is determined that the pair of clamp portions 18F, 18R are located in the gripping positions when the rotation speed of the centering motor M4 falls below a set reference value for determining that the gripping has been achieved.

When the article B to be transferred is fully received and supported by the pair of divided placement support portions 17F and 17R, and the pair of clamp portions 18F and 18R are in the retracted positions and in the gripping positions in which the article B is gripped, the control device 7 controls the operations of the travel electric motor M1 and the vertical movement electric motor M2 based on the detected information from the laser travel range finder and the laser vertical range finder to move the article transfer device 14 to the unloading position at the storage location in the article storage rack 1 specified as the transport destination.

When the article transfer device 14 is located in the unloading position at the storage location specified as the transport destination, and after ensuring that no other articles B exist at the storage location in the article storage rack 1 based on the detected information from the on-rack article detection sensor 15, the control device 7 operates the fork motors M5 of the front and back clamp units 35F and 35R by a set amount of stroke to the projecting side toward the storage location to project the pair of clamp portions 18F, 18R to push the article B into the storage location. Simultaneously, the conveyor motor M3 in the front side placement support portion 17F and the conveyor motor M3 in the back side placement support portion 17R are cause to start operating in the side that would cause the article be pushed into the storage location. In addition, similar to the case of the scooping action, the rotation operating speed of fork motor M5 and the rotation operating speed of each conveyor motor M3 of the pair of divided placement support portions 17F and 17R are controlled by the control device 7 such that the transporting speed of the article B as it is transported by the pair of projecting clamp portions 18F, 18R is in synchronization with, or matches, the transporting speed of the article B as it is transported by the plurality of rotating rotary rollers 21 provided to each of the pair of divided placement support portions 17F and 17R.

In this manner, when the pair of clamp portions 18F and 18R are located in the projected positions and when the article B to be transferred is located in the storage location in the article storage rack 1 designated as a transport destination as shown in FIG. 9, the centering motor M4 is controlled in the position control mode to switch the pair of clamp portions 18F and 18R from the gripping positions shown with solid lines in FIG. 9 to the releasing positions shown with imaginary lines in FIG. 9. That is, the centering motor M4 is stopped after the centering motor M4 is operated by a target drive amount in a move-apart direction to move the clamp portions 18F and 18R away from each other by a set operating amount for a grip release operation from the state in which the pair of clamp portions 18F and 18R are in the gripping positions.

And when the pair of clamp portions 18F and 18R are in the projected positions and in the releasing positions to release the grip on the article B, the fork motors M5 in the front and back clamp units 35F, 35R are operated in the retrieval direction to retract the pair of clamp portions 18F and 18R. Incidentally, the conveyor motor M3 in the front side placement support portion 17F, and the conveyor motor M3 in the back side placement support portion 17R may be left unoperated in this case.

Alternative Embodiments

Alternative embodiments of the present invention are described next.

(1) In the embodiment described above, an example was described in which the placement support portion includes only the pair of divided placement support portions. However, the invention is not limited to this example. For example, a placement support portion may be so configured to have an intermediate support member that is narrow in the article lateral direction for receiving and supporting an intermediate portion, in the article lateral direction, in the bottom surface of an article. By providing an intermediate support member, the article can be reliably received and supported by the placement support portion even where an article to be transferred would be bent downward and change shape if it was supported only by the pair of divided placement support portions, because the portion in question of the article can be supported by the intermediate support member.

(2) In the embodiment described above, an example was described in which the roller actuator drivingly rotates all of the plurality of rotary rollers. However, the invention is not limited to this example. And some or all of the rotary rollers may be configured as freely rotating rollers.

(3) In the embodiment described above, an example was described in which each of the pair of divided placement support portions is provided with a plurality of rotary rollers which can rotate about laterally extending axes arranged along the article transfer direction. However, the invention is not limited to this example. For example, each of a pair of divided placement support portion may consist of simply a pair of plate-shaped members that receive and support an article.

(4) In the embodiment described above, an example was described in which the article transfer device was mounted on a stacker crane. However, the invention is not limited to this example. For example, the article transfer device may be mounted on an unmanned article carriage.

(5) In the embodiment described above, an example was described in which each of the pair of clamp portions consists of a plate-shaped member that has a claw and that is projected and retracted by a projecting-retracting operation portion. A so-called belt clamp type may be used instead. That is, each of the pair of clamp portion may include an article transporting endless revolving body that, in the gripping position, contacts the lateral side of an article to be transferred and that is circulated about vertical axes. In this case, it is preferable to provide an circulating actuator for driving and circulating the endless revolving body in each of the pair of clamp portions such that the actuator can be moved in unison with the clamp portion.

Also, in this case, transporting means such as a roller conveyor etc. may or may not be provided to the pair of divided placement support portions. When a pair of divided placement support portions include transport drive means such as a roller conveyor, etc. which is actuated by a conveyor motor that functions as a transport drive device, the controller may control the operations of the transport drive device and the circulating actuator such that the transporting speed of the endless revolving body as it is circulated is in synchronization with the transporting speed of the transporting means in the pair of divided placement support portions.

(6) In the embodiment described above, an example is described in which each of the pair of clamp portions and the corresponding one of the pair of divided placement support portion are connected to each other so that they can be moved in unison and in which the clamp actuator functions also as the placement support portion actuator. Instead, each of the pair of clamp portions and each of the pair of divided placement support portions may be configured such that they can be moved separately and independently. And the clamp actuator and the placement support portion actuator may be provided separately.

INDUSTRIAL APPLICABILITY

The present invention can be utilized in an article transfer device used in a warehouse etc. and a stacker crane having the article transfer device.

DESCRIPTION OF THE REFERENCE NUMERALS AND SYMBOLS

A Stacker Crane
M3 Roller Actuator
M4 Placement Support Portion Actuator, Clamp Actuator
G Gap
3 Vertically Movable Platform, Base Platform
Controller
17, 17F, 17R Pair of Divided Placement Support Portions
18, 18F, 18R Pair-of Clamp Portions
Rotary Roller

The invention claimed is:

1. An article transfer device for transferring two or more kinds of articles having different lengths in an article lateral direction which is perpendicular to an article transfer direction, comprising:
   a placement support portion that is provided to a base platform and that receives and supports an article to be transferred;
   a pair of clamp portions that are configured to be moved along the article transfer direction with respect to the placement support portion, and that are capable of being moved toward and away from each other between gripping positions for gripping the article to be transferred and releasing positions that are spaced apart wider than the gripping positions; and
   a clamp actuator for moving the pair of clamp portions toward and away from each other;
   wherein,
   the placement support portion includes a pair of divided placement support portions that separately receive and support both side portions, in the article lateral direction, of a bottom surface of the article to be transferred,
   each of the pair of divided placement support portions includes a plurality of rotary rollers which can rotate about laterally extending axes arranged along the article transfer direction,
   a roller actuator for drivingly rotating the plurality of rotary rollers is provided to each of the pair of divided placement support portions so as to be movable in unison therewith in the article lateral direction with respect to the base platform,
   the pair of divided placement support portions are configured to be moved toward and away from each other within limits of a movable range defined in the article lateral direction and to face each other in close proximity when located at approach limit positions which are limit positions in the movable range that are closer to each other,
   there are provided a placement support portion actuator for moving the pair of divided placement support portions toward and away from each other and a controller for controlling operations of the clamp actuator and the placement support portion actuator based on length information, in the article lateral direction, of the article to be transferred,
   arranged below the plurality of rotary rollers is a conveyor driving belt which contacts a lower portion of at least part of the plurality of rotary rollers, and
   the roller actuator circulates the conveyor driving belt.

2. The article transfer device as defined in claim 1, wherein the placement support portion consists only of the pair of divided placement support portions.

3. The article transfer device as defined in claim 1, wherein when the pair of divided placement support portions are located at the approach limit positions, a dimension of a gap formed in the article lateral direction between the pair of divided placement support portions is less than the length, in the article lateral direction, of each of the pair of divided placement support portions.

4. The article transfer device as defined in claim 1, wherein each of the pair of clamp portions and a corresponding one of the pair of divided placement support portions are connected to each other so as to be movable in unison, and in that the clamp actuator functions also as the placement support portion actuator.

5. The article transfer device as defined in claim 1, wherein each of the pair of clamp portions includes an article transporting endless revolving body that, when at the gripping position, contacts a lateral side of the article to be transferred and that is circulated about a vertical axis, and in that an circulating actuator for circulating and driving the endless revolving body is provided to each of the pair of clamp portions so as to be movable in unison therewith.

6. A stacker crane having an article transfer device, as defined in claim 1, on a vertically movable platform, wherein the base platform is the vertically movable platform.

7. The article transfer device as defined in claim 1,
wherein a clamp projecting and retracting actuator is provided for projecting and retracting the pair of clamp portions along the article transfer direction with respect to the placement support portion, and
wherein the controller controls operations of the clamp projecting and retracting actuator and the roller actuator such that a transporting speed of the article as the article is transported by the pair of clamp portions that are projected and retracted matches a transporting speed of the article as the article is transported by the plurality of rotary rollers that are rotated and that are provided to each of the pair of divided placement support portions.

8. The article transfer device as defined in claim 1,
wherein the conveyor driving belt is arranged to contact lower portions of all of the plurality of rotary rollers except two rotary rollers including a left end roller and a right end roller which are located in respective ends in the article transfer direction,
wherein each of the left end roller and the right end roller is operatively connected to one of the plurality of rotary rollers that is located next thereto by a transmission belt, and
wherein the roller actuator drivingly rotates all of the plurality of rotary rollers by circulating the conveyor driving belt.

* * * * *

UNITED STATES PATENT AND TRADEMARK OFFICE
CERTIFICATE OF CORRECTION

| | |
|---|---|
| PATENT NO. | : 9,221,605 B2 |
| APPLICATION NO. | : 13/390607 |
| DATED | : December 29, 2015 |
| INVENTOR(S) | : Takashi Fujita |

It is certified that error appears in the above-identified patent and that said Letters Patent is hereby corrected as shown below:

Claims
Column 19, Line 3, Claim 5, delete "that an" and insert -- that a --

Signed and Sealed this
Twenty-sixth Day of April, 2016

Michelle K. Lee
*Director of the United States Patent and Trademark Office*